United States Patent
Kang et al.

[11] Patent Number: 5,821,134
[45] Date of Patent: Oct. 13, 1998

[54] METHOD OF MANUFACTURING AN OPTOELECTRONIC DEVICE

[75] Inventors: Byung-Kwon Kang, Suwon; Jung-Koo Kang, Kyoungki-do; You-Ri Jo, Seoul; Jong-Deog Kim; Seung-Jo Jeong, both of Kyoungki-do; Young-kun Sin, Seoul, all of Rep. of Korea

[73] Assignee: Hyundai Electronics Industries Co., Ltd., Kyoungki-do, Rep. of Korea

[21] Appl. No.: 882,309

[22] Filed: Jun. 25, 1997

[30] Foreign Application Priority Data

Jun. 29, 1996 [KR] Rep. of Korea ................... 96-26309

[51] Int. Cl.⁶ .................................................. H01L 21/00
[52] U.S. Cl. ........................ 438/40; 438/745; 438/955; 257/18; 257/263; 156/649.1
[58] Field of Search ............................... 438/39, 40, 745, 438/955, 289, 293; 257/18, 263; 156/649.1

[56] References Cited

U.S. PATENT DOCUMENTS 4,994,143  2/1991  Kim ....................................... 156/649
5,420,066  5/1995  Shima et al. ........................... 437/129
5,556,804  9/1996  Nagai ..................................... 437/129

Primary Examiner—John Niebling
Assistant Examiner—Long Pham
Attorney, Agent, or Firm—Ware, Fressola, Van Der Sluys & Adolphson

[57] ABSTRACT

Disclosed is a method of producing an electron-absorption modulator having a reverse mesa structure. In the electron-absorption modulator, a first clad of a first conductivity type, an active layer of the first conductivity type, a second clad layer of a second conductivity type and an ohmic contact layer of the second conductivity type are formed on a semiconductor substrate of the first conductivity type. Then, a predetermined mask pattern is formed on the ohmic contact layer. Afterwards, the ohmic contact layer is etched by using the mask pattern. Then, the second clad layer and the active layer below the ohmic contact layer are etched in the form of the reverse mesa structure to expose the first clad layer. Then, the first clad layer is etched at a predetermined depth in the form of a mesa structure.

8 Claims, 4 Drawing Sheets

METHOD OF MANUFACTURING AN OPTOELECTRONIC DEVICE

BACKGROUND OF THE INVENTION

1. Field of the Invention

The present invention relates to a method of manufacturing an optoelectronic device, and more particularly to a method of manufacturing an electron-absorption (hereinafter simply referred to as "EA") modulator having a reverse mesa structure.

2. Discussion of the Related Art

A laser diode produces a laser beam by receiving an current from an outer electric power source. In an optical communication system, as the laser diode is used as a light signal generating source, the laser beam generated from the laser diode can be either directly modulated, or indirectly modulated by using an outer modulator. An EA modulator among outer modulators operates on the basis of an electron absorbing difference according to an electric field of a semiconductor. The EA modulator modulates the laser beam generated from the laser diode. In the EA modulator, it is required to form a waveguide having a proper size and to have an electrostatic capacity suitable for a high speed modulation.

FIG. 1 is a sectional view of a conventional EA modulator having a mesa structure. Hereinbelow, the conventional EA modulator will be explained in more detail with reference to FIG. 1.

In the conventional EA modulator, a $N^+$-InP clad layer 2 is formed on a $N^+$-InP substrate 1. Then, an u-InGaAs active layer 3 is formed on the $N^+$-InP clad layer 2, and a $P^+$-InP clad layer 4 is formed on the u-InGaAs active layer 3. Next, a P-type ohmic contact layer 5 is formed on the $P^+$-InP clad layer 4. Thereafter, a predetermined mask pattern(not shown) is formed on the P-type ohmic contact layer 5. The P-type ohmic contact layer 5, the $P^+$-InP clad layer 4, the u-InGaAs active layer 3 and the $N^+$-InP clad layer 2 are etched at a time by a non-selective wet etching. As a result, a mesa structure is formed. Thereafter, successive processes (not shown) are performed, and whereby the EA modulator is manufactured.

As described above, the EA modulator is formed as the mesa structure so that the u-InGaAs active layer 3 has a width suitable for the waveguide mode. Since the P-type ohmic contact layer 5, the P+-InP clad layer 4 and the u-InGaAs active layer 3 are etched at a time by the non-selective wet etching during the formation of the mesa structure, the width of the P-type ohmic contact layer 5 becomes narrow. In addition, the width of the P-type ohmic contact layer 5 becomes narrower as a thickness of the $N^+$-InP clad layer 2 is increased. Accordingly, it is possible to obtain the u-InGaAs active layer 3 having a desired width. However, a contact resistance increase with decrease of the P-type ohmic contact layer 5. As a result, the characteristics of the EA modulator are deteriorated.

SUMMARY OF THE INVENTION

The present invention is provided to solve the foregoing problems. It is an object of the present invention to provide a method of manufacturing an electron-absorption modulator capable of controlling a width of an active layer regardless of a width of a clad layer so that the active layer can function a waveguide, and capable of reducing a contact resistance.

In order to achieve the above object, the present invention provides a method of manufacturing an optoelectronic device, comprising the steps of: providing a semiconductor substrate of a first conductivity type on which a first clad layer of the first conductivity type, an active layer of the first conductivity type, a second clad layer of a second conductivity type and an ohmic contact layer of the second conductivity type are formed in sequence; forming a predetermined mask pattern on the ohmic contact layer; etching the ohmic contact layer by using the mask pattern; etching the second clad layer and the active layer in the form of a reverse mesa structure to expose the first clad layer; etching the first clad layer at a predetermined depth in the form of a mesa structure; forming a polyimide layer on the substrate to fill the etched portions of both sides of the reverse mesa structure; exposing the ohmic contact layer by removing the mask pattern; forming an electrode of the second conductivity type on the exposed the ohmic contact layer; and forming an electrode of the first conductivity type on a bottom surface of the substrate.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, the preferred embodiment of the present invention will be explained in more detail with reference to the accompanying drawings.

Figure 1:
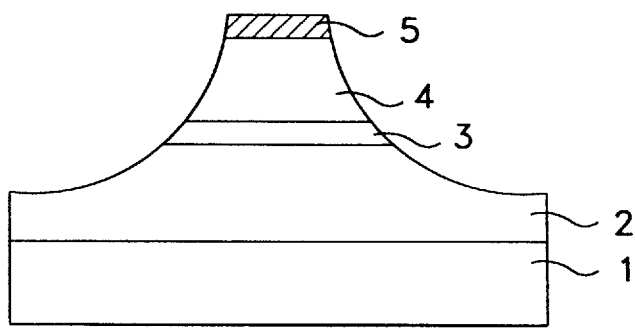
FIG. 1 is a sectional view of a conventional EA modulator having a mesa structure.
Figure 2A:
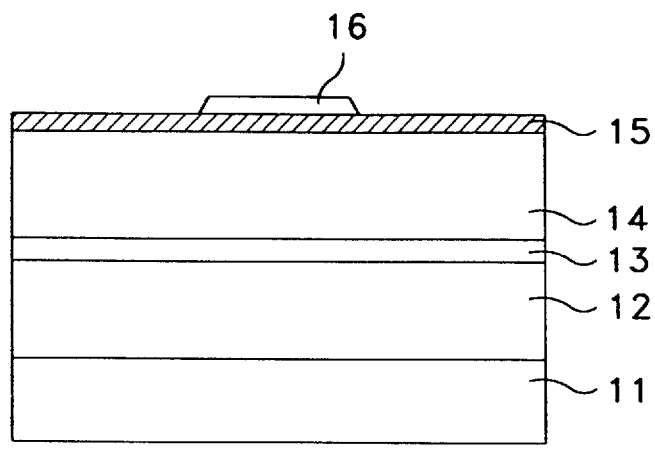
FIGS. 2A to 2F are sectional views of an EA modulator according to the preferred embodiment of the present invention, showing a method of producing the EA modulator.

As shown in FIG. 2A, in an EA modulator according to the present invention, a $N^+$-InP clad layer 12 is formed on a $N^+$-InP substrate 11. Then, an u-InGaAs active layer 13 is formed on the $N^+$-InP clad layer 12, and a $P^+$-InP clad layer 14 is formed on the u-InGaAs active layer 13. Next, a P-type ohmic contact layer 15 is formed on the P+-InP clad layer 14. Thereafter, an insulating layer, preferably, a silicon oxidation layer, is formed on the P-type ohmic contact layer and patterned, thereby form a predetermined mask pattern 16.

Figure 2B:
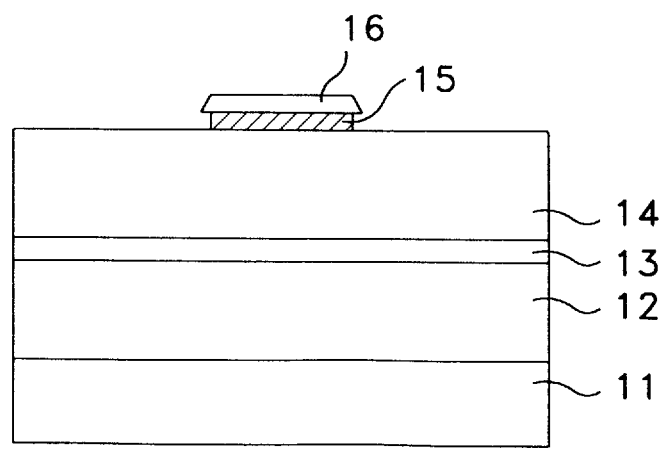
Figure 2C:
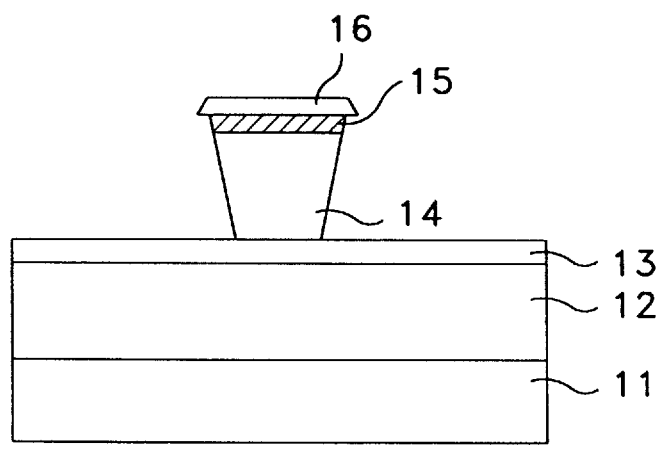

As shown in FIG. 2B, the P-type ohmic contact layer 15 is etched by using an etching process employing the mask pattern 16 as an etching mask. Then, as shown in FIG. 2C, the $P^+$-InP clad layer 14 is etched in the form of a reverse mesa structure by using a selective wet etching in which the P-type ohmic contact layer 15 is used as an etching mask. Preferably, the selective wet etching comprises a wet etching in which a solution of HBr and $H_2O$ is used.

Figure 2D:
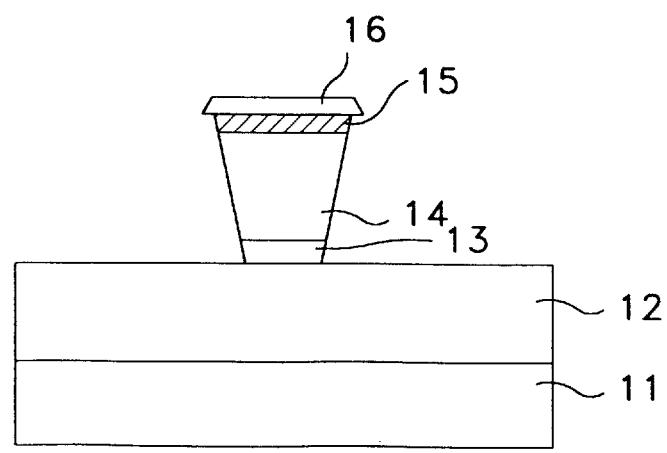
Figure 2E:
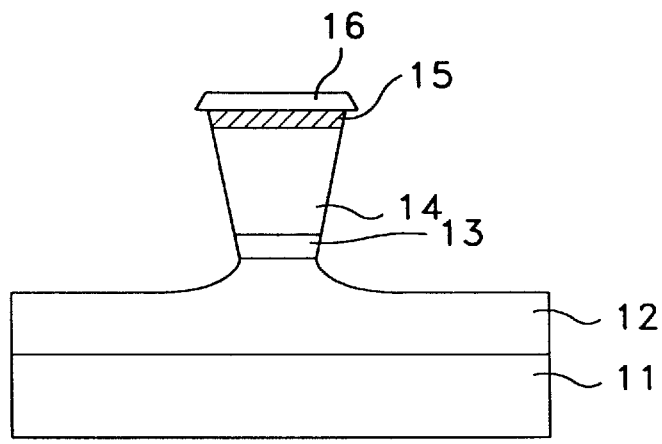

Thereafter, as shown in FIG. 2D, the u-InGaAs active layer 13 is also etched in the form of a reverse mesa structure by using the above wet etching. As a result, the $N^+$-InP clad layer 12 is exposed. The reverse mesa structure has a shape wherein its sides are sloped and its top is wider than its bottom. The u-InGaAs active layer 13 has a proper width allowing the u-InGaAs active layer 13 for functioning a waveguide. As shown in FIG. 2E, a surface of the $N^+$-InP clad layer 12 is etched at a predetermined depth in the form of mesa structure by using the non-selective wet etching. At this time, the reverse mesa structure is continuously maintained.

Figure 2F:
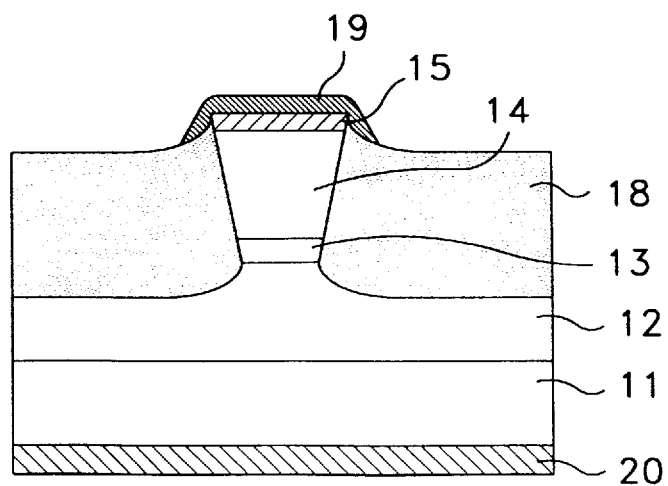

As shown in FIG. 2F, a polyimide film 18 is formed on the structure of FIG. 2E to fill the etched portions of both sides of the reverse mesa structure. The mask pattern 16 is then removed, and the surface of the P-type ohmic contact layer 15 is exposed. Thereafter, a metal layer is formed on the surface of the P-type ohmic contact layer 15 and patterned, thereby form a P-type electrode 19. A N-type electrode 20 is formed on a bottom surface of the $N^+$-InP substrate 11.

As described above, according to the preferred embodiment of the present invention, the $P^+$-InP clad layer 14 and the u-InGaAs active layer 13 are etched in the form of the reverse mesa structure by using the selective wet etching. In addition, the $N^+$-InP clad layer 12 is etched in the form of the mesa structure by using the non-selective wet etching. Accordingly, regardless of the thickness of the $P^+$-InP clad layer 14, the u-InGaAs active layer 13 has the proper width so that the u-InGaAs active layer 13 can function a waveguide. Furthermore, as the $P^+$-InP clad layer 14 and the u-InGaAs active layer 13 are etched in the form of the reverse mesa structure, the width of the P-type ohmic contact layer 15 is increased. As a result, the contact resistance decreases. In addition, the characteristic of the EA modulator is enhanced.

While the present invention has been particularly shown and described with reference to a particular embodiment thereof, it will be understood by those skilled in the art that various changes in form and detail may be effected therein without departing from the spirit and scope of the invention as defined by the appended claims.

What is claimed is:

1. A method of manufacturing an optoelectronic device, comprising the steps of:

providing a semiconductor substrate of a first conductivity type on which a first clad layer of the first conductivity type, an active layer of the first conductivity type, a second clad layer of a second conductivity type and an ohmic contact layer of the second conductivity type are formed in sequence:

forming a mask pattern on the ohmic contact layer;

etching the ohmic contact layer by using said mask pattern layer;

etching the second clad layer and the active layer to form a reverse mesa structure to expose the first clad layer; and etching the first clad layer to a selected depth to form a mesa structure.

2. The method of manufacturing an optoelectronic device as claimed in claim 1, wherein the mask pattern is an insulating layer.

3. The method of manufacturing an optoelectronic device as claimed in claim 2, wherein the insulating layer is a silicon oxidation layer.

4. The method of manufacturing an optoelectronic device as claimed in claim 1, wherein the second clad layer and the active layer are respectively etched by a selective etching using an etchant having a higher etching selectivity to the second clad layer and the active layer than to the first clad layer and the ohmic contact layer.

5. The method of manufacturing an optoelectronic device as claimed in claim 4, wherein the selective etching is a wet etching.

6. The method of manufacturing an optoelectronic device as claimed in claim 5, wherein the wet etching uses a solution of HBr and $H_2O$.

7. The method of manufacturing an optoelectronic device as claimed in claim 1, wherein the first clad layer is etched by a non-selective etching using an etchant having a uniform selectivity to the first clad layer, the active layer, the second clad layer and the ohmic contact layer.

8. The method of manufacturing an photoelectric element as claimed in claim 1, further comprising the steps of:

forming a polyimide layer on the substrate to fill the etched portions of both sides of the reverse mesa structure;

exposing the ohmic contact layer by removing the mask pattern;

forming a electrode of the second conductivity type on the exposed ohmic contact layer; and forming a electrode of the first conductivity type on a bottom surface of the substrate.

* * * * *

UNITED STATES PATENT AND TRADEMARK OFFICE
CERTIFICATE OF CORRECTION

PATENT NO : 5,821,134
DATED : October 13, 1998
INVENTOR(S): Kang et al

It is certified that error appears in the above-identified patent and that said Letters Patent is hereby corrected as shown below:

At column 1, line 46, please cancel "P+-InP" and substitute --$P^+$-InP-- therefor.

At column 2, line 43, please cancel "P+-InP" and substitute --$P^+$-InP-- therefor.

Signed and Sealed this

Second Day of March, 1999

*Attest:*

Q. TODD DICKINSON

*Attesting Officer*       *Acting Commissioner of Patents and Trademarks*